United States Patent [19]

Andreae

[11] Patent Number: 4,894,073
[45] Date of Patent: Jan. 16, 1990

[54] FILTER

[76] Inventor: Erhard C. Andreae, CH - 1122, Romanel-sur-Morges, Switzerland

[21] Appl. No.: 327,554

[22] Filed: Mar. 23, 1989

[30] Foreign Application Priority Data

Apr. 9, 1988 [GB] United Kingdom ............... 8808372

[51] Int. Cl.$^4$ .............................................. B01D 47/00
[52] U.S. Cl. ................... 55/240; 55/DIG. 46; 261/112.1; 261/113; 118/326; 98/115.2
[58] Field of Search ............... 55/240, 241, DIG. 46; 98/115.2; 261/112.1, 113; 118/326

[56] References Cited

U.S. PATENT DOCUMENTS 3,524,302  8/1970  Jalma .................................... 55/240
4,484,513  11/1984 Napadow .......................... 55/DIG. 46

FOREIGN PATENT DOCUMENTS 67774  8/1979  U.S.S.R. ............................. 98/115.2

Primary Examiner—Bernard Nozick
Attorney, Agent, or Firm—Richard Bushnell

[57] ABSTRACT

The filter is formed by a wall (6) separating a vacuum chamber (3a, 3b) from a space (1) where a paint spray gun (2) is located. The lower part (5) of the wall (6) dips into the water of a collecting tank (7). The wall (6) is pierced by a multiplicity of holes, in each of which is fastened a tube (8) projecting on its two faces. On the same side as the vacuum chamber (3a, 3b), each tube is equipped with a deflector (10) at its outflow. Water from a reservoir (11) flows off via an overflow (12) and streams (15) over the entire upstream face of the wall (6). This water rebounds on the projecting parts of the tubes (8), and the shape and size of the pent roofs (9) guarantee that the tubes (8) suck up the best possible mixture of air and water. This assists the capture of paint droplets by the water. The deflectors, by compelling the mixture of air and water laden with paint droplets or other impurities to change direction abruptly, assist the capture of these droplets by the water. Baffles (13) ensure that the air is separated from the water laden with paint residues, which falls into the tank (7). The filter, by dividing the air mass to be filtered into a multiplicity of small streams, ensures effective separation of the paint residues from the air. The deflectors have the same effect. Operation is not very noisy.

4 Claims, 2 Drawing Sheets

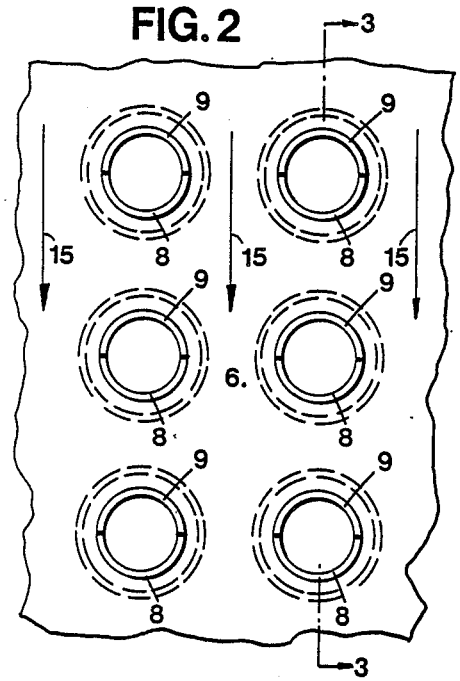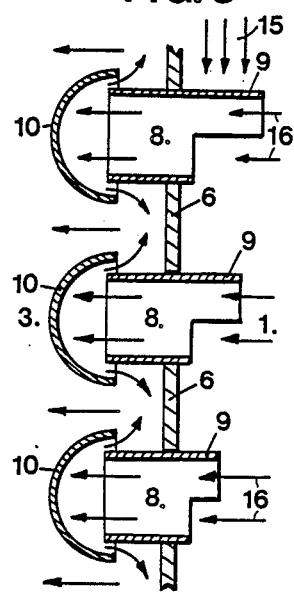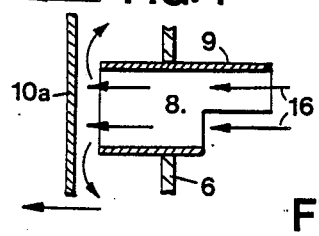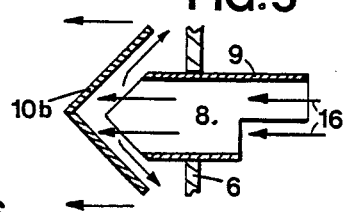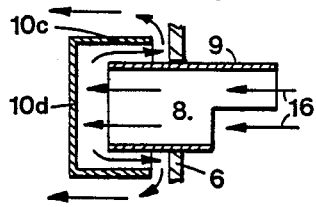

FILTER

Air filtration installations used in booths where painting by gun spraying is carried out are already known and are designed as follows. A chamber in which a vacuum is maintained is separated from the paint booth by means of a vertical wall, over the paint-side face of which water is made to stream and falls into a tank located underneath this wall. The lower edge of the latter is slightly above the surface of the water in the tank, so that all the air sucked up together with liquid which has streamed over this wall and therefore mixed with paint is sucked through this gap together with water from the tank. The object is to ensure that the paint droplets are separated from the air and are caught by the water which absorbs them.

However, these known installations have serious disadvantages. First of all, the air laden with droplets, passing over the surface of the water in the collecting tank through the horizontal gap formed between this surface and the lower edge of the vertical wall, is composed of large bubbles, in which many paint droplets are enclosed without coming into contact with the water. Filtration is therefore incomplete. Furthermore, suction solely by way of this gap at the bottom of the wall is inefficient in terms of the elimination of the air laden with impurities, and the passage of the air through this gap makes a very irritating noise.

The object of the present invention is to provide an improved filter for an installation of this type, which rectifies these defects.

The filter according to the invention conforms to claim 1.

The accompanying drawing illustrates by way of examples an embodiment and alternative versions of the filter according to the invention.

FIG. 2 is a partial front view, on a larger scale, of the filter in FIG. 1, seen from the upstream side.

FIG. 3 is a partial sectional view along 3—3 of FIG. 2.

FIGS. 4, 5 and 6 are views similar to that of FIG. 3, but showing three alternative versions of a filter element.

Figure 1:
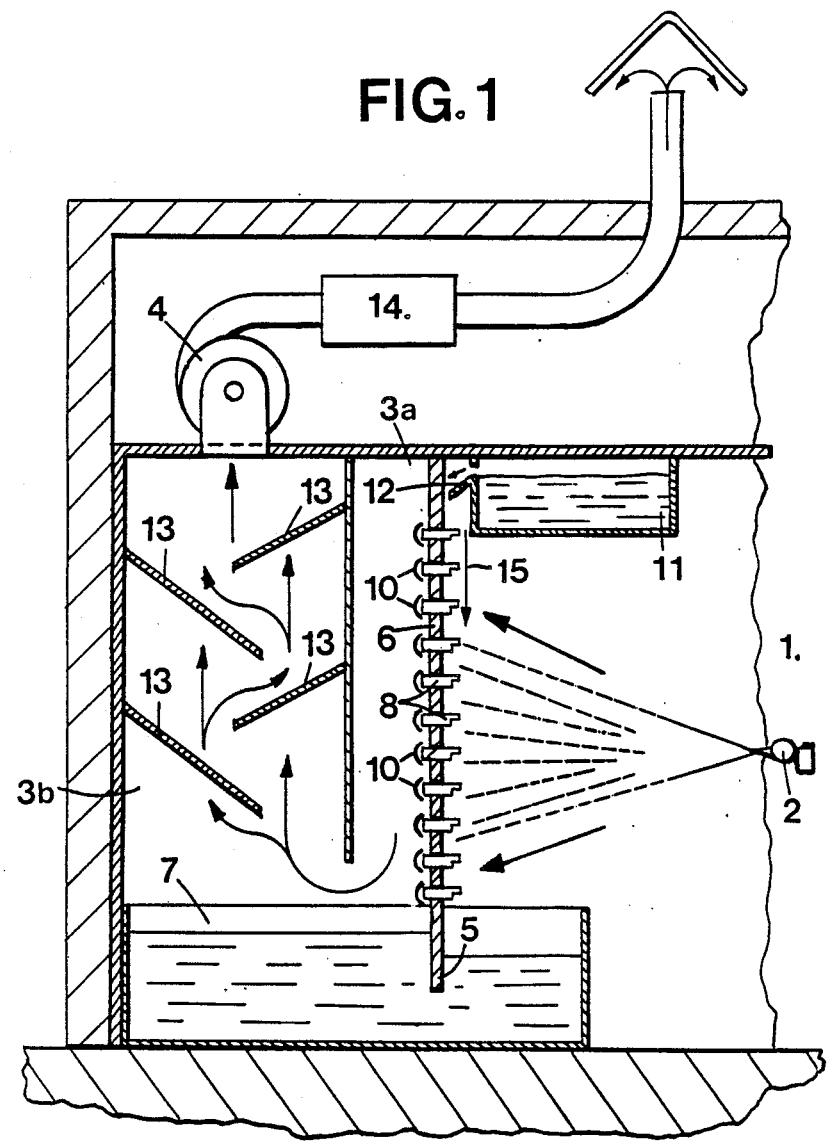
FIG. 1 shows diagrammatically, in a vertical profile section, a filtration installation incorporating this embodiment of the filter according to the invention.

FIG. 1 shows, at 1, part of a booth in which painting is carried out by means of a gun 2. At 3a, 3b there is a chamber in which a vacuum is maintained by means of a turbine 4. The part 3a of the chamber is separated rom the space 1 by means of a vertical filtration wall 6, the lower part 5 of which dips into the water of a collecting tank 7. This wall 6 is pierced by a multiplicity of holes, in each of which a tube, such as 8, is engaged and fastened. These tubes project on both faces of the wall 6. On the same side as the space 1 (the upstream side), the tubes are cut to form a sort of pent roof 9. On the side of the vacuum chamber 3a, 3b (the downstream side), each of these tubes is equipped with a deflector 10 which can take different forms and which is fastened to it by means which are not shown.

The installation according to FIGS. 1, 2 and 3 functions as follows.

When the turbine 4 has been out into operation, a vacuum is established in the chamber 3a, 3b. A difference in level forms in the collecting tank 7 between the two sides of the wall 6.

A circulating pump (not shown) is put into operation at the same time as the turbine 4 and transfers water from the tank 7 into an upper reservoir 11 equipped with an overflow 12.

When the level of the water in the reservoir 11 reaches the overflow 12, the water spills out over the entire width of the wall 6 and, as indicated by the arrows 15, streams over the upstream face of this wall and then falls into the tank 7.

This streaming water falls onto the pent roofs 9 of the tubes 8 and splits into droplets, thus increasing the liquid surface considerably and assisting the capture of the paint drops by the water. The paint drops sprayed at 2 meet the film of water flowing over the wall and the droplets formed when this film meets the pent roofs 9. As a result of this, the paint droplets come into contact with the water and are fixed to this.

Under the effect of the vacuum prevailing in the chamber 3a, 3b, suction takes place via the tubes 8 (as indicated by the arrows 16). In fact, these tubes form the only communication between this chamber and the space 1. A mixture of air and water laden with paint droplets is sucked into the tubes 8 in this way. When this mixture reaches the outflow end of the tubes 8 in the part 3a of the chamber, it encounters the deflector means 10 which compel it to change direction abruptly thus forcing the air bubbles to come in close contact with the water, with the effect that all the residues of paint or other impurities are captured by the water. In the part 3b of the chamber the mixture of air and water laden with paint droplets travels upwards under the action of the turbine 4. At the same time, this mixture encounters baffles 13 which the water (together with the paint) strikes and on which it flows, finally falling into the collecting tank 7, whilst the filtered air, that is to say the air freed of impurities, passes into the turbine and then through a cooling unit 14, before being ejected outwards.

The water entering the collecting tank 7 is laden with paint and must be replaced periodically in a known way.

It is advantageous if the length of the parts 9 forming a pent roof decreases from top to bottom, as shown in FIG. 3.

The example described speaks of water and paint; water to which chemicals products are added or another liquid could also be considered; instead of sprayed paint, there could be particles of very small size which are to be filtered.

By means of the filter described, the installation ensures excellent filtration because of the division of the air flow into a multiplicity of streams and because of the resulting close contact between the liquid and the air laden with impurities. Moreover, operation is not very noisy.

In the alternative version according to FIG. 4, the deflector 10a is formed by a plane surface arranged opposite the outflow of each tube 8.

In the case of FIG. 5, the deflector 10b is in the form of an angle brace, in the alternative version according to FIG. 6 it has the form of a cylinder 10c equipped with a bottom 10d and partially engaged over the tube 8, so that its bottom 10d is opposite the outflow of 8 and at a short distance from this. According to FIGS. 3, 5 and 6, the deflector takes the form of a hood placed opposite and at a short distance from the outflow of the tubes 8, this being beneficial to good agitation of the mixture coming out of these tubes.

Other forms of deflectors can easily be imagined.

The inside diameter of the tubes 8 can vary according to the installations and the products treated. For example, it can be 10 to 25 mm.

I claim:

1. Apparatus comprising: a housing defining a vacuum chamber; a wet wall comprising at least part of the housing, which wet wall is provided with a plurality of through holes including a plurality of tubes positioned in the holes which tubes communicate respectively with the vacuum chamber and with the surroundings of the housing; a plurality of deflector means situated in the vacuum chamber and being spaced from said tubes; a liquid source; and a liquid collecting tank, which tank communicates with both the vacuum chamber and said surroundings and into which tank the wet wall extends; said liquid source being located such that liquid therefrom flows over a surface of the wet wall external to the housing, and is drawn together with air from the surroundings and any impurities carried in that air, via the plurality of tubes, into the vacuum chamber as a liquid-air mixture, the movement of this liquid-air mixture in a direction parallel to the tubes being impeded by the deflector means.

2. Apparatus for use in an installation for the washing of air laden with impurities, in a workspace; said apparatus comprising: a vacuum chamber; wet wall separating said workspace from said vacuum chamber; liquid supply means for delivering a stream of liquid over an inflow side of said wet wall which comprises the side facing said workspace; wherein said wet wall has a plurality of through openings and a tube extending through each of said through openings and projecting from at least one face of said wall, such that a mixture of said liquid and said air laden with impurities is forced to pass through said tubes by the vacuum in said vacuum chamber, and further including deflector means arranged in said vacuum chamber opposite an outflow end of the tubes, comprising an end of said tubes facing the vacuum chamber, to compel said mixture to atomize and change direction abruptly, such that the air is made to come into sufficiently close contact with the liquid that the impurities are captured by the liquid, and further including a collecting tank located at a bottom portion of the vacuum chamber and extending at least partly into said workspace, said wet wall having a lower part extending into the liquid in said collecting tank so that the passage of said mixture between the two sides of the wall is only by means of said tubes.

3. Apparatus according to claim 2 wherein that part of the tubes which project on the inflow side are formed to define a pent roof.

4. Apparatus according to claim 2 wherein said deflectors take the form of a hood placed opposite and at a short distance from the outflow end of the tubes.

* * * * *